United States Patent [19]
Yahagi

[11] Patent Number: 5,939,043
[45] Date of Patent: Aug. 17, 1999

[54] PROCESS FOR PREPARING $LI_xMN_2O_4$ INTERCALATION COMPOUNDS

[75] Inventor: Masataka Yahagi, Mayfield Heights, Ohio

[73] Assignee: GA-TEK Inc., Eastlake, Ohio

[21] Appl. No.: 09/105,659

[22] Filed: Jun. 26, 1998

[51] Int. Cl.[6] .......................... C01G 45/12; C01G 45/02; H01M 4/50
[52] U.S. Cl. .......................... 423/599; 423/605; 429/224
[58] Field of Search .............................. 423/599; 429/224

[56] References Cited

U.S. PATENT DOCUMENTS

| | | |
|---|---|---|
| 4,246,253 | 1/1981 | Hunter . |
| 4,312,930 | 1/1982 | Hunter . |
| 4,812,426 | 3/1989 | Takagi et al. . |
| 4,828,834 | 5/1989 | Nagaura et al. .......................... 429/194 |
| 4,904,552 | 2/1990 | Furukawa et al. . |
| 4,980,251 | 12/1990 | Thackeray et al. . |
| 5,135,732 | 8/1992 | Barboux et al. . |
| 5,153,081 | 10/1992 | Thackeray et al. . |
| 5,166,012 | 11/1992 | Rossouw et al. .......................... 429/224 |
| 5,196,279 | 3/1993 | Tarascon . |
| 5,266,299 | 11/1993 | Tarascon . |
| 5,425,932 | 6/1995 | Tarascon . |
| 5,506,077 | 4/1996 | Koksbang .......................... 429/224 |
| 5,506,078 | 4/1996 | Davidson et al. .......................... 429/224 |
| 5,607,485 | 3/1997 | Gozdz et al. . |
| 5,630,993 | 5/1997 | Amatucci et al. . |
| 5,635,138 | 6/1997 | Amatucci et al. . |
| 5,639,438 | 6/1997 | Ellgen .......................... 423/594 |
| 5,674,645 | 10/1997 | Amatucci et al. . |
| 5,677,087 | 10/1997 | Amine et al. .......................... 429/224 |
| 5,683,835 | 11/1997 | Bruce .......................... 429/224 |
| 5,693,307 | 12/1997 | Bowden et al. .......................... 423/599 |
| 5,693,435 | 12/1997 | Amatucci et al. . |
| 5,695,887 | 12/1997 | Amatucci et al. . |
| 5,700,442 | 12/1997 | Bloch et al. . |
| 5,700,598 | 12/1997 | Denis et al. . |
| 5,702,679 | 12/1997 | Sheargold et al. . |
| 5,705,291 | 1/1998 | Amatucci et al. . |
| 5,705,297 | 1/1998 | Warren . |
| 5,718,877 | 2/1998 | Manev et al. . |
| 5,733,681 | 3/1998 | Li et al. .......................... 429/194 |
| 5,733,685 | 3/1998 | Wang .......................... 429/224 |
| 5,747,193 | 5/1998 | Gerand et al. . |
| 5,753,202 | 5/1998 | Wang et al. .......................... 423/599 |
| 5,766,569 | 6/1998 | Ellgen et al. .......................... 423/599 |
| 5,770,018 | 6/1998 | Saidi .......................... 204/157.15 |

*Primary Examiner*—Gary P. Straub
*Assistant Examiner*—Cam N. Nguyen
*Attorney, Agent, or Firm*—Mark Kusner; Michael A. Centanni

[57] ABSTRACT

A method of forming lithium manganese oxide spinel, comprising the steps of combining predetermined amounts of lithium carbonate powder and manganese dioxide powder, the powders having predetermined surface areas; mixing the lithium carbonate and manganese dioxide for about 0.5 hours to about 2.0 hours in a manner so as to thoroughly mix the powders, but not to significantly increase the surface area of the powders; increasing the temperature of the mixture from approximately room temperature to a calcining temperature between about 700° C. to about 900° C.; maintaining the calcining temperature of the mixture between about 700° C. to about 900° C. for about 7 hours to about 13 hours; reducing the temperature of the mixture from the calcining temperature to about 500° C. at a cooling rate between about 10° C./hour to about 120° C./hour; and cooling the mixture from 500° C. to room temperature.

15 Claims, 6 Drawing Sheets

PROCESS FOR PREPARING $LI_xMN_2O_4$ INTERCALATION COMPOUNDS

FIELD OF THE INVENTION

The present invention relates generally to secondary lithium batteries, and more particularly, to a process for preparing $Li_xMn_2O_4$ spinel intercalation compounds for use in secondary lithium batteries.

BACKGROUND OF THE INVENTION

U.S. Pat. No. 5,196,279 to Tarascon discloses the use and advantages of intercalated lithium manganese oxide ($Li_xMn_2O_4$) spinel in forming secondary lithium batteries. Heretofore, lithium manganese oxide ($Li_xMn_2O_4$) based intercalation compounds were produced by a fairly lengthy process. The accepted process for producing such intercalation compound called for mixing the base component of lithium carbonate $Li_2CO_3$ and manganese dioxide $MnO_2$ for approximately 48 hours to insure thorough mixing of the material. The mixing was conventionally done by a conventional rotary mixer.

The mixing was then followed by several heating and cooling steps to calcine the material. The material was calcined at a temperature of about 800° C. or below. The final cooling of the material (from about 800° C. to about 500° C.) was gradual, taking about 99 hours. The total time for the aforementioned conventional process was about 300 to 400 hours. Not only is such a process time-consuming, it also utilizes expensive equipment and significant amounts of energy.

The present invention overcomes these and other problems and provides a process for producing lithium manganese oxide ($Li_xMn_2O_4$) spinel intercalation compounds that require significantly shorter processing time and reduce the overall cost, while providing a high-performance material.

SUMMARY OF THE INVENTION

In accordance with the present invention, there is provided a method of forming lithium manganese oxide spinel, comprising the steps of combining predetermined amounts of lithium carbonate and manganese dioxide; heating the mixture from room temperature to a calcining temperature in the range of about 800° C. to about 860° C. in about 8 hours or less; maintaining the mixture at the calcining temperature of about 800° C. to about 860° C. for about 10 hours or less; reducing the temperature of the mixture from the calcining temperature to about 500° C. at a rate between about 10° C./hour and about 120° C./hour; and cooling the mixture from about 500° C. to room temperature.

In accordance with another aspect of the present invention, there is provided a method of forming lithium manganese oxide spinel, comprising the steps of combining predetermined amounts of lithium carbonate powder and manganese dioxide powder, the powders having predetermined surface areas; mixing the lithium carbonate and manganese dioxide for about 0.5 hours to about 2.0 hours in a manner so as to thoroughly mix the powders, but not to significantly increase the surface area of the powders; increasing the temperature of the mixture from approximately room temperature to a calcining temperature in the range of between about 700° C. and about 900° C.; maintaining the calcining temperature of the mixture between about 700° C. to about 900° C. for about 7 hours to about 13 hours; reducing the temperature of the mixture from the calcining temperature to about 500° C. at a cooling rate between about 10° C./hour and about 120° C./hour; and cooling the mixture from 500° C. to room temperature.

It is an object of the present invention to provide a process for preparing lithium manganese oxide ($Li_xMn_2O_4$) spinel intercalated compounds for rechargeable lithium batteries.

It is another object of the present invention to provide a process as defined above that is significantly less time-consuming than conventional processes.

A still further object of the present invention is to provide a process as described above, wherein the surface area and particle size of the intercalated compound may be controlled by varying the calcining time.

A still further object of the present invention is to provide a process as defined above that produces high-quality lithium manganese oxides.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

The present invention relates to a method for synthesizing lithium manganese oxide ($Li_xMn_2O_4$) spinel intercalation compounds for use in forming secondary lithium batteries. Broadly stated, the process is comprised of a first mixing phase wherein predetermined amounts of lithium carbonate ($Li_2CO_3$) powder and manganese dioxide ($MnO_2$) powder are mixed, a heating phase wherein the mixture of lithium carbonate and manganese dioxide powders is heated for a predetermined period of time at an elevated temperature in excess of the temperature at which the powders react, and a cooling phase wherein the synthesized lithium manganese oxide is cooled at a controlled rate to minimize the oxygen vacancies therein.

Referring now to the mixing phase, predetermined amounts of lithium carbonate and manganese dioxide are mixed together. The stoichiometric amounts of the respective powders to produce the desired intercalated compound are conventionally known, and is based upon the following chemical reaction between lithium carbonate and manganese dioxide to form lithium manganese oxide:

$Li_2CO_3 + 4MnO_2 = 2LiMn_2O_4 + CO_2 + \frac{1}{2}O_2$.

Based upon the foregoing chemical reaction to produce lithium manganese oxides ($Li_xMn_2O_4$) wherein x ranges from 0.95 to 1.10, a molar ratio of about 0.95 to about 1.10 moles of lithium carbonate powder to 4 moles of manganese dioxide powder are mixed together. According to one aspect of the present invention, the manganese dioxide powder has a predetermined surface area ranging from about 25 $m^2/g$ to about 35 $m^2/g$, and more preferably about 30 $m^2/g$. The surface area of the lithium carbonate is not critical to the present invention in that the lithium carbonate breaks down during the reaction and during the mixing phase. In this respect, the lithium carbonate may have an initial surface area ranging from about 0.6 $m^2/g$ to about 1.0 $m^2/g$. The surface areas disclosed herein are measured by conventional BET standards. The mixing of the lithium carbonate powder with the manganese dioxide powders is preferably performed in a conventional ball mixer. The mixing balls are preferably as large as possible and are preferably formed of zirconia, which is relatively hard and will not react with the respective powders. According to the present invention, the respective powders are mixed at room temperature for a period of about 0.1 to 5.0 hours, and more preferably for a period of about 0.5 to 2.0 hours, or a lesser time if thorough mixing can be accomplished. Importantly, the powders are mixed at a rate such that the surface area of the manganese dioxide $MnO_2$ powder is not increased as a result of mixing.

Figure 1:
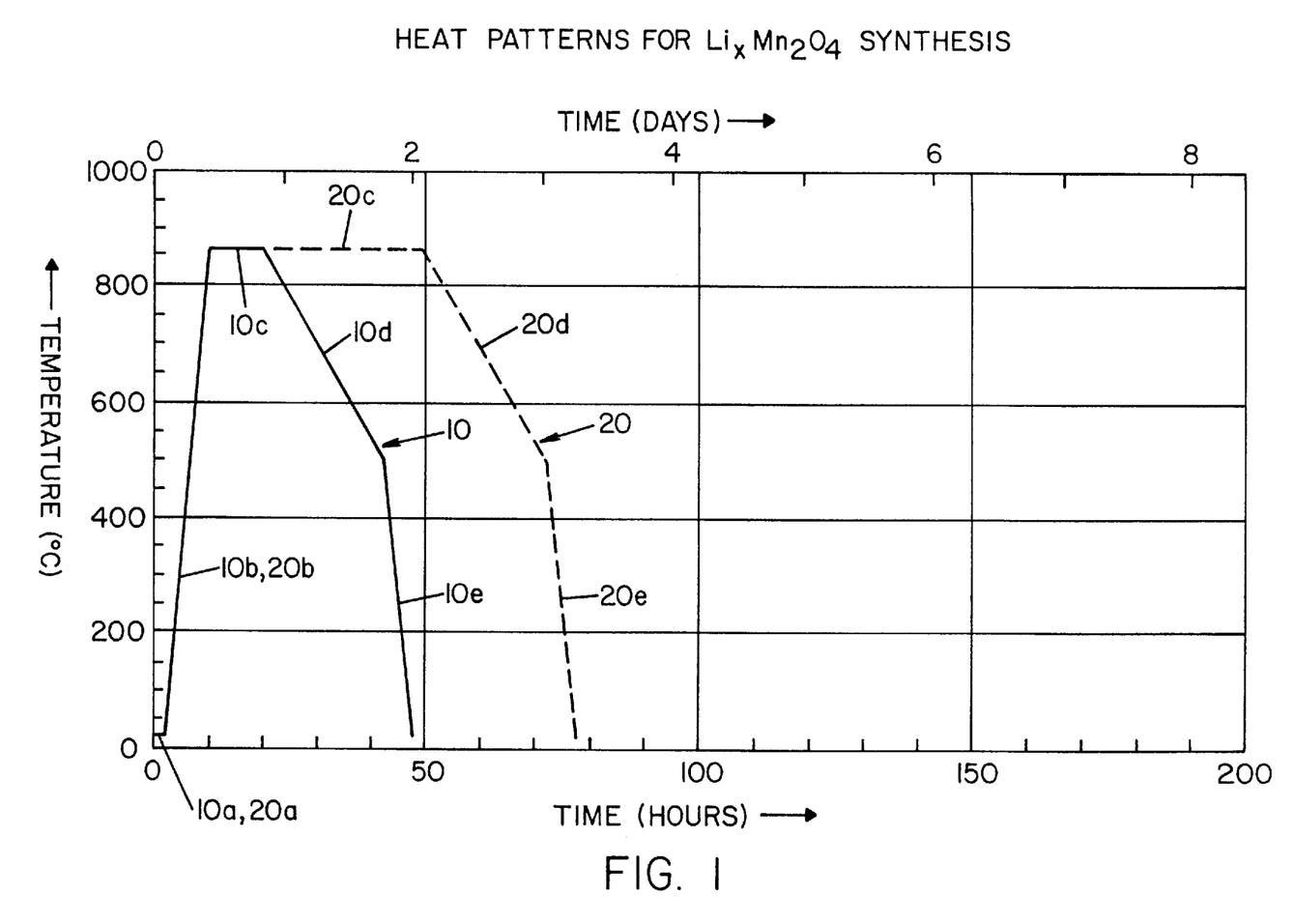
FIG. 1 is a time/temperature graph illustrating heat patterns for synthesizing lithium manganese oxide ($Li_xMn_2O_4$) spinel intercalation compounds, illustrating preferred processes according to the present invention.

Referring now to the heating phase, FIG. 1 shows two heat patterns designated 10 and 20 illustrating preferred processes for synthesizing lithium manganese oxide spinel intercalation compounds according to the present invention. The heating phase is generally comprised of two separate phases, i.e., a first heating phase wherein the mixed powders are heated from room temperature to a calcining temperature, and a second heating phase, wherein the powders are maintained at a calcining temperature for a predetermined period of time. In FIG. 1, portions 10b and 10c of line 10 illustrate respectively the first heating phase and the second heating phase of a first synthesis process. (Horizontal portion 10a of line 10 is representative of the time utilized during the mixing phase of the first synthesis, wherein the temperature of the powders remains at room temperature.) Similarly, portion 20b and 20c of heat pattern 20 represents the first heating phase and the second heating phase respectively of a second synthesis process, wherein horizontal portion 20a is representative of the mixing phase of the second synthesis process.

In accordance with the present invention, the temperatures of the lithium carbonate and manganese dioxide powders preferably rise during the first heating phase from room temperature to the calcining temperature in about 7 to 10 hours, and more preferably in about 8 to 9 hours. In a preferred embodiment, the heating of the powder mixture from room temperature to the calcining temperature occurs in about 8 hours.

Figure 2:
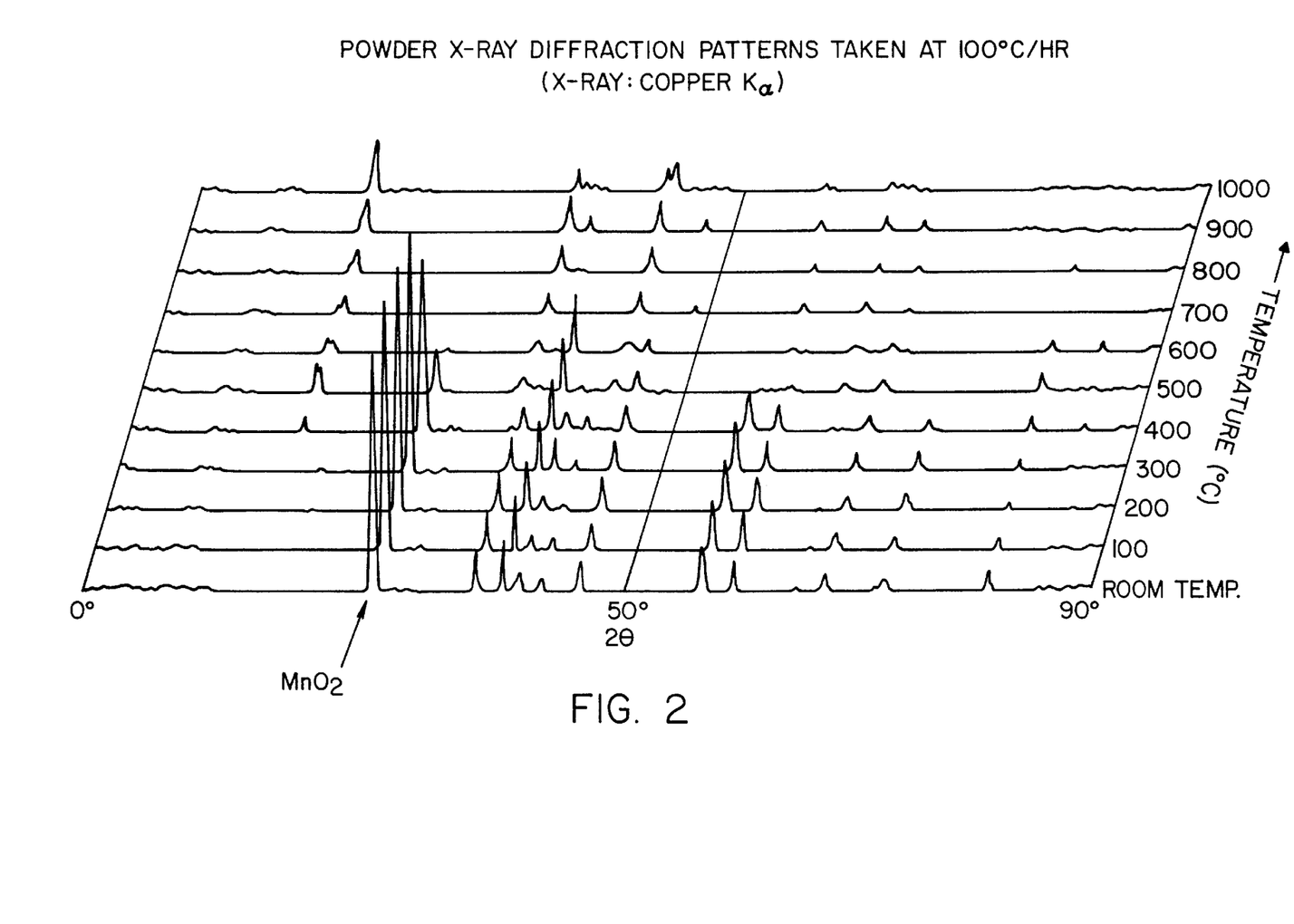
FIG. 2 is a graph of x-ray diffraction patterns at various heat levels of a mixture of lithium carbonate powder and manganese oxide powder, illustrating the consumption of $MnO_2$ and the temperature at which the manganese oxide reacts with the lithium carbonate.

The calcining temperature is preferably between about 700° C. and about 900° C., and more preferably between about 800° C. to 880° C. In the embodiment shown in FIG. 1, the calcining temperature is about 860° C., as represented by line portions 10c and 20c. With respect to the preferred calcining temperature, it has been found that the lithium carbonate $Li_2CO_3$ powder and the manganese dioxide $MnO_2$ powder react at temperatures of about 700° C. In this respect, FIG. 2 shows x-ray diffraction patterns for the lithium carbonate and manganese dioxide powder mixture at various stages of the synthesis process. Samples were taken and x-rayed at one-hour intervals as the temperature of the powder mixture was increased at a rate of 100° C./hour. The x-ray diffraction patterns were obtained using conventional x-ray diffraction techniques wherein copper $K_\alpha$ x-rays were utilized. The x-ray patterns show distinctive manganese dioxide $MnO_2$ spikes at 2θ equals about 28°. As seen in FIG. 2, the distinctive manganese spike begins to dissipate at about 500° C. and have completely disappeared at 700° C., indicating that the reaction between the lithium carbonate and manganese dioxide has occurred. FIG. 2 thus shows that a minimum calcining temperature of about 700° C. is required to produce a reaction between the lithium carbonate $Li_2CO_3$ and manganese dioxide $MnO_2$ powders. In accordance with the present invention, the calcining temperature preferably exceeds 700° C., and more preferably exceeds 700° C. by at least 100° C. to drive the reaction at a quicker pace. As indicated above, in a preferred process, the calcining temperature is about 860° C.

Figure 3:
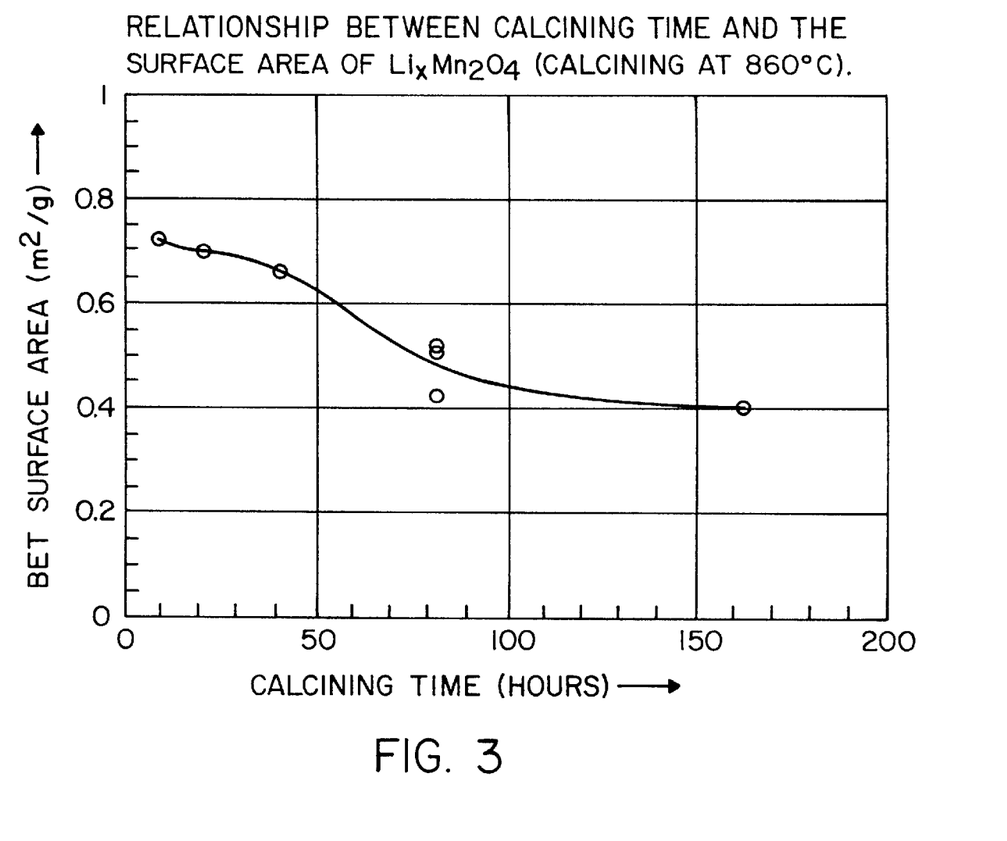
FIG. 3 is a graph showing the relationship between the surface area and calcining time of the resulting lithium manganese oxide ($Li_xMn_2O_4$) spinel intercalated compound.
Figure 4:
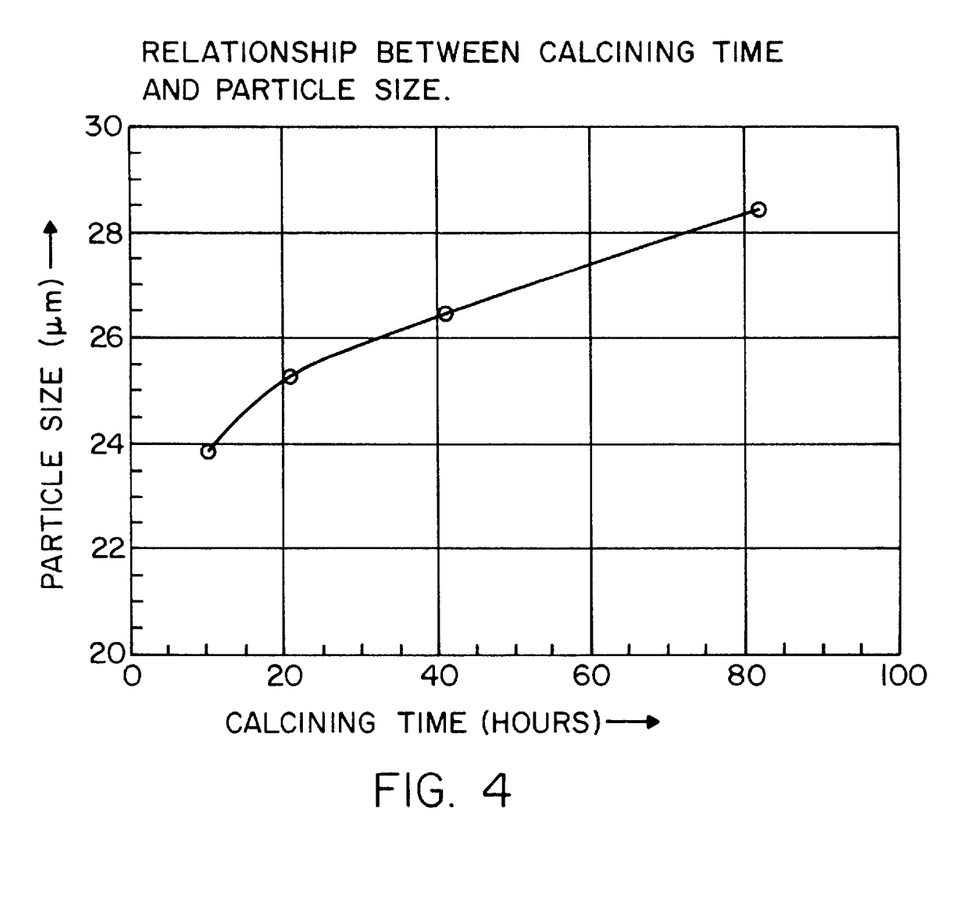
FIG. 4 is a graph showing the relationship between particle size and calcining time of the synthesized lithium manganese oxide ($Li_xMn_2O_4$) spinel intercalated compound.

Referring now to the second heating phase (i.e., the calcining time), it has been found that by varying the calcining period, the average particle size of the resulting lithium manganese oxide compound varies, as does the surface area of the synthesized material. Specifically, the longer the calcining the time, the larger the particle size of the resulting lithium manganese oxide and the lower the surface area of such material. In this respect, as the calcining period is extended, the lithium manganese oxide compound begins to agglomerate to form larger particles, thereby reducing the overall surface area of the material. FIG. 3 shows the relationship between the calcining time and the surface area of the resulting lithium manganese oxide compound. As shown in this graph, as the calcining time begins to exceed about 10 hours (at 860° C.), the surface area of the resulting material begins to decrease. This phenomenon is also shown in FIG. 4, which shows the relationship between the calcining time and the particle size of the resulting lithium manganese oxide. As seen in FIG. 4, as the calcining time begins to exceed approximately 10 hours, the particle size of the resulting synthesized lithium manganese oxide compound begins to increase.

The particle size and surface area of the lithium manganese oxide are important as they directly affect the operating characteristics of lithium batteries produced therewith. Specifically, it has been found that the greater the surface area (i.e., the smaller the particle size of the lithium manganese oxide compound), the higher the rate performance of the battery. On the other hand, the lower the surface area (i.e., the larger the particle size), the better the cycleability (i.e., the better the recharging characteristics) of the lithium battery. The operating characteristics of the resultant battery are thus determined by the particle size and the surface area of the synthesized lithium manganese oxide compound, which in turn are determined by the calcining period.

Lines 10 and 20 of FIG. 1 show two separate processes having different calcining periods represented by line portions 10c and 20c. Line 10 illustrates a preferred process for producing lithium manganese oxide compounds having large surface area and small particle size. In the embodiment shown, the calcining period of the process illustrated by line portion 10c is about 10 hours. Line 20 of FIG. 1 illustrates a process for producing larger particle size with smaller overall surface area, and discloses a calcining period represented by line portion 20c of about 40 hours.

Figure 5:
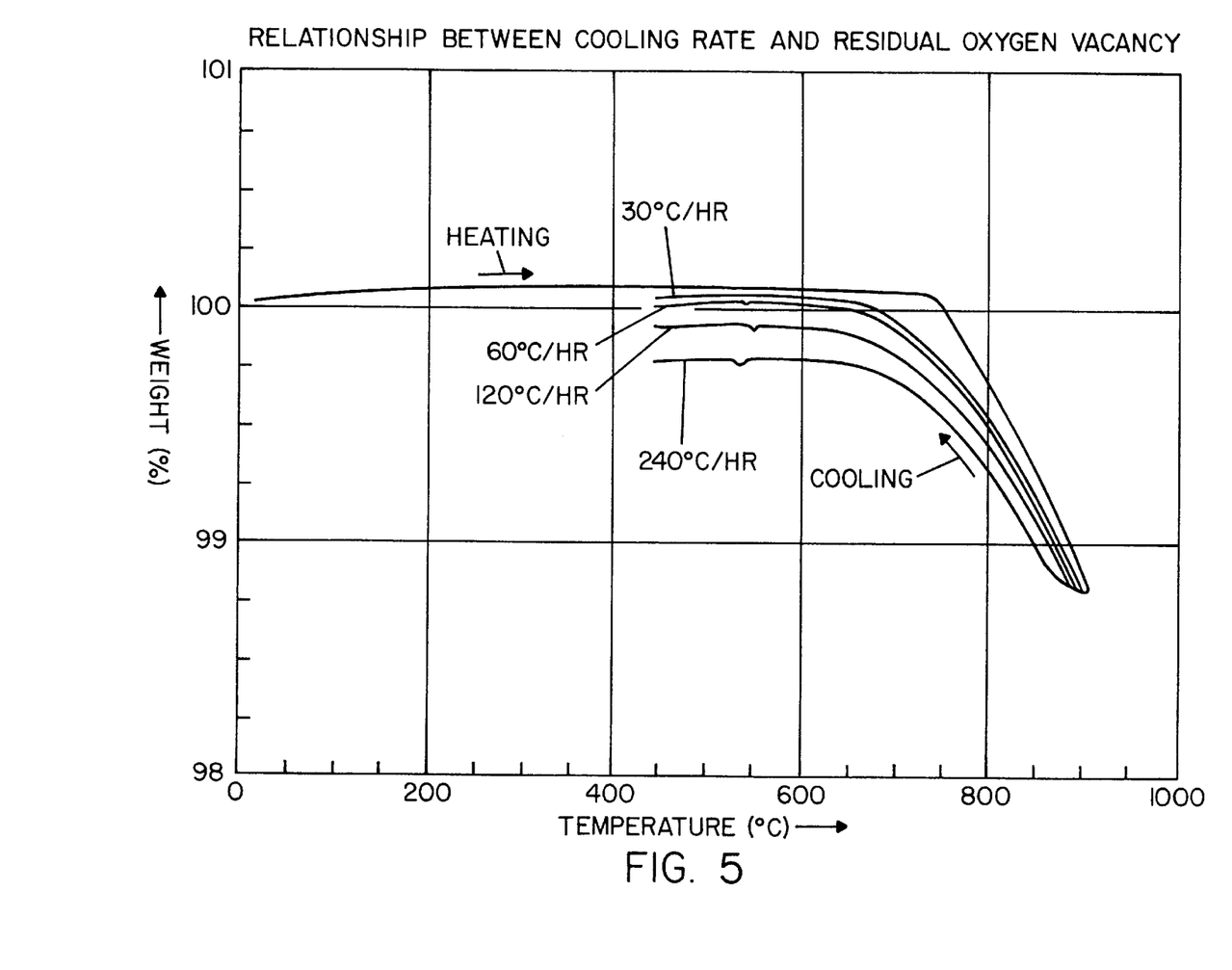
FIG. 5 is a graph showing the relationship between residual oxygen vacancy and the cooling rate of the resulting lithium manganese oxide ($Li_xMn_2O_4$) spinel intercalation compound.

Referring now to the cooling phase of the processes, the lithium manganese oxide $Li_xMn_2O_4$ compound is cooled at a controlled rate to minimize oxygen vacancies in the resulting material. In accordance with the present invention, the calcined material is preferably cooled from its calcining temperature to a temperature of about 500° C. at a rate of about 10° C. per hour to about 20° C. per hour, and more preferably at about 15° C. per hour. At a cooling rate of about 15° C. per hour, approximately 24 hours is required to cool the lithium manganese oxide from 860° C. to 500° C. Portions 10d and 20d of lines 10 and 20 of FIG. 1 are representative of the cooling of the lithium manganese oxide from the calcining temperature to 500° C. The cooling rate of the lithium manganese oxide is important to minimize the oxygen vacancy within the resulting material. In this respect, FIG. 5 illustrates the heating cycle of lithium carbonate and manganese dioxide powders to produce lithium manganese oxide and the cooling cycle for the same. FIG. 5 shows four samples, each of which are heated at the same rate to a temperature of about 860° C. to 900° C. The four samples were then cooled, but at different rates, as illustrated in FIG. 5. As shown in FIG. 5, the slower the cooling rate, the lower the oxygen vacancy concentration within the resulting lithium manganese oxide $Li_xMn_2O_4$ compound. As shown in FIG. 5, the higher the cooling rate, the greater the residual oxygen vacancy concentration in the resulting material.

The present invention thus provides a method of synthesizing lithium manganese oxide compound at a processing time significantly less than processes known heretofore. As shown in FIG. 1, a process illustrated by line 10 shows that synthesis of a lithium manganese oxide compound can be performed in about 48 hours and can produce lithium manganese oxide material having an appropriately large surface area and small particle size. Line 20 of FIG. 1 represents a process where the calcining period is extended an additional 30 hours (over that illustrated by line 10) to provide lithium manganese oxide material having a larger particle size and less surface area.

The present invention shall now be further described by way of an Example.

EXAMPLE 310.324 g of $Li_2CO_3$ and 1390.988 g of $MnO_2$ are weighed. The BET surface area of the $MnO_2$ powder is about 30 m$^2$/g. The powders are put in a three-liter plastic bottle with stabilized, 20 mm diameter zirconia balls having a total weight of approximately 1700 g. The bottle is rotated by conventional means for one hour to mix the powders. The mixed powders are then separated from the zirconia balls by means of a #40 sieve. The powder mixture is placed into an alumina crucible, and then placed in an electric furnace for calcination.

The powder is heated from room temperature to 860° C. at a heating rate of about 100° C./hour, and calcined at a temperature of about 860° C. for 10 hours. Following the calcining phase, the temperature of the compound is cooled down to 500° C. at a controlled rate of about 15° C./hour. The compound is then cooled from 500° C. to room temperature at a cooling rate of about 100° C./hour. The BET surface area of the compound is 0.66 m$^2$/g. The calcined powder is checked by x-ray diffraction and identified as $Li_xMn_2O_4$ spinel. The resultant composition is used as the cathode active material for two lithium ion batteries.

Figure 6:
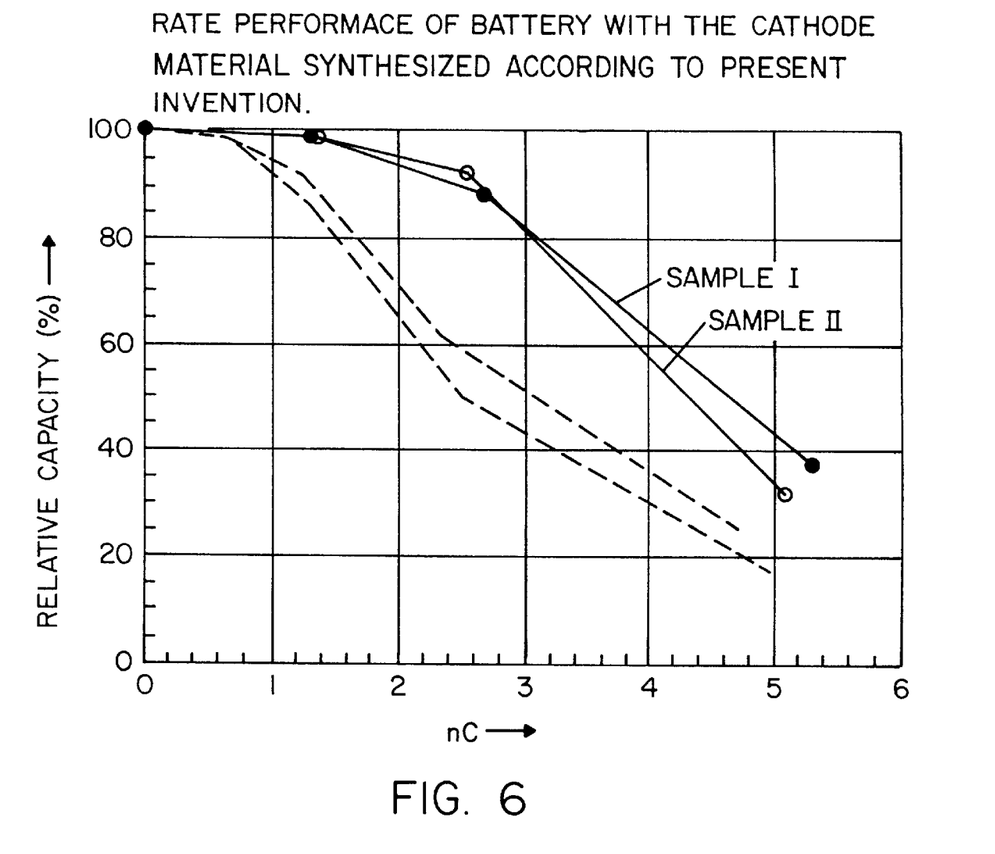
FIG. 6 is a graph showing the performance of rechargeable lithium ion batteries formed using lithium manganese oxide ($Li_xMn_2O_4$) spinel intercalation compounds synthesized according to the present invention compared to rechargeable lithium ion batteries formed with lithium manganese oxide ($Li_xMn_2O_4$) spinel intercalation compounds synthesized according to a conventional process.

FIG. 6 shows the rate performance of the two rechargeable lithium ion batteries. Performance curves for the two batteries formed using the lithium manganese oxide $Li_xMn_2O_4$ compounds synthesized according to the present invention are marked "Sample I" and "Sample II." The other curves shown in FIG. 6 relate to batteries formed using lithium compounds synthesized using conventional long-time processes as discussed in the "Background of the Invention." FIG. 6 shows that the performance of batteries using lithium manganese oxide compounds formed in accordance with the present invention have better performance than batteries formed in a much longer, conventional process.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A method of forming lithium manganese oxide spinel, comprising the steps of:
   combining lithium carbonate powder and manganese dioxide powder, said manganese dioxide ($MnO_2$) powder having a BET surface area of between about 25 m$^2$/g and about 35 m$^2$/g;
   mixing said lithium carbonate and manganese dioxide so as not to increase the surface area of the lithium carbonate and manganese dioxide;
   heating said mixture from room temperature to a calcining temperature of about 800° C. to about 860° C. in about 8 hours or less;
   maintaining said mixture at said calcining temperature of about 800° C. to about 860° C. for about 10 hours;
   reducing the temperature of said mixture from said calcining temperature to about 500° C. at a rate between about 10° C./hour and about 120° C./hour;
   cooling said mixture from about 500° C. to room temperature.

2. A method as defined in claim 1, wherein said lithium carbonate powder and manganese dioxide powder are mixed for about 0.1 hour to about 2.0 hours.

3. A method as defined in claim 2, wherein said mixing is performed in a ball-milling machine.

4. A method as defined in claim 1, wherein said rate of cooling is between about 12° C./hour and about 30° C./hour.

5. A method as defined in claim 4, wherein said cooling rate is generally constant.

6. A method as defined in claim 1, wherein said lithium carbonate and said manganese dioxide are in powder form.

7. A method as defined in claim 1, wherein said cooling of said mixture from about 500° C. to room temperature occurs in about 8 hours or less.

8. A method as defined in claim 1, wherein said calcining temperature is about 860° C.

9. A method of forming lithium manganese oxide spinel, comprising the steps of:
   combining lithium carbonate powder and manganese dioxide powder, said manganese dioxide powder having a BET surface area of about 30 m$^2$/g;

mixing said lithium carbonate and manganese dioxide powders for about 0.5 hours to about 2.0 hours to thoroughly mix said powders, but not to significantly increase the surface area of said powders;

increasing the temperature of said mixture from approximately room temperature to a calcining temperature of between about 700° C. to about 900° C.;

maintaining the calcining temperature of said mixture between about 700° C. and about 900° C. for about 7 hours to about 13 hours;

reducing the temperature of said mixture from said calcining temperature to about 500° C. at a cooling rate of between about 10° C./hour and about 120° C./hour; and cooling said mixture from 500° C. to room temperature.

10. A method as defined in claim 9, wherein said mixing of said lithium carbonate powder and said manganese dioxide powder is performed in a ball-milling machine.

11. A method as defined in claim 9, wherein said calcining temperature is between about 800° C. and 860° C.

12. A method as defined in claim 11, wherein said cooling rate is between about 12° C./hour and about 30° C./hour.

13. A method as defined in claim 12, wherein said cooling rate is generally constant.

14. A method as defined in claim 9, wherein said cooling rate is between about 12° C./hour and about 30° C./hour.

15. A method as defined in claim 14, wherein said cooling rate is generally constant.

* * * * *